(12) United States Patent
Naware et al.

(10) Patent No.: US 8,645,732 B2
(45) Date of Patent: Feb. 4, 2014

(54) PROTOCOL STACK POWER OPTIMIZATION FOR WIRELESS COMMUNICATIONS DEVICES

(75) Inventors: Vidyut M. Naware, Sunnyvale, CA (US); Ketan N. Patel, San Jose, CA (US); Eugene T. Sy, Santa Clara, CA (US); Parvathanathan Subrahmanya, Sunnyvale, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 323 days.

(21) Appl. No.: 13/013,381

(22) Filed: Jan. 25, 2011

(65) Prior Publication Data

US 2011/0208984 A1    Aug. 25, 2011

Related U.S. Application Data

(60) Provisional application No. 61/306,357, filed on Feb. 19, 2010.

(51) Int. Cl.
G06F 1/32    (2006.01)
G06F 1/00    (2006.01)

(52) U.S. Cl.
USPC ............................ 713/320; 713/322; 713/324

(58) Field of Classification Search
USPC .......... 713/300, 320, 322–324; 709/220–221, 709/223–224, 227–228
See application file for complete search history.

(56) References Cited

U.S. PATENT DOCUMENTS

| | | | |
|---|---|---|---|
| 7,570,593 B1* | 8/2009 | ElBatt et al. | 370/238 |
| 2005/0245215 A1* | 11/2005 | Abhishek et al. | 455/127.5 |
| 2006/0072490 A1* | 4/2006 | McLaughlin et al. | 370/328 |
| 2006/0259627 A1* | 11/2006 | Kellerer et al. | 709/227 |
| 2007/0206634 A1* | 9/2007 | Lotter et al. | 370/469 |
| 2008/0168283 A1* | 7/2008 | Penning | 713/310 |

FOREIGN PATENT DOCUMENTS

| | | |
|---|---|---|
| EP | 2073596 A1 | 6/2009 |
| WO | 2005002137 A1 | 1/2005 |

OTHER PUBLICATIONS

Yuan, Wanghon et al. Design and Evaluation of a Cross-Layer Adaptation Framework for Mobile Multimedia Systems. SPIE/ACM Multimedia Computing and Networking Conference (MMCN). 2003. pp. 1-13.*

International Search Report and Written Opinion—PCT/US2011/025330—ISA/EPO—Jun. 9, 2011.

Yuan, Wanghon et al., Design and Evaluation of a Cross-Layer Adaptation Framework for Mobile Multimedia Systems, Multimedia Computing and Networking Conference (MMCN), 2003, pp. 1-13, SPIE/ACM.

* cited by examiner

Primary Examiner — Thomas J Cleary
(74) Attorney, Agent, or Firm — Stanton Braden (57) ABSTRACT

User experiences on wireless devices are affected by communication, computation, and user interface capabilities. Another key performance indicator of a wireless device is its battery life. A method, algorithm and apparatus for improving the communication, computation and user interface capabilities of a mobile device is disclosed, which requires the expenditure of less energy and increases battery life. The trade-off between battery life and user experience related to the communication capability is managed by a protocol stack power optimization algorithm that optimally allocates energy resources. The power management algorithm inputs and combines measurements made at various layers of the protocol stack to selectively control a set of actions impacting energy usage. The algorithm maps from a set of measurements to a set of actions that provides the best trade-off between user experience and energy consumption.

39 Claims, 4 Drawing Sheets

PROTOCOL STACK POWER OPTIMIZATION FOR WIRELESS COMMUNICATIONS DEVICES

CLAIM OF PRIORITY UNDER 35 U.S.C. §119

The present application for patent claims priority to Provisional Application No. 61/306,357 entitled "OPTIMIZING USER EQUIPMENT POWER/BATTERY CONSUMPTION USING INFORMATION ACROSS THE PROTOCOL STACK" filed Feb. 19, 2010, and assigned to the assignee hereof and hereby expressly incorporated by reference herein.

BACKGROUND

1. Field

The present invention relates generally to wireless communications, and more specifically to reducing power consumption and improving the user experience in wireless communication devices.

2. Background

Minimizing power consumption and/or improving the data rate and user experience in User Equipment (UE) devices is important for all wireless communications systems. UE devices are increasingly consuming higher amounts of power as they become more and more sophisticated. UE devices have an onboard battery with a limited capacity. Thus, there is a problem of getting the best possible user experience under the constraint of a limited battery. There is therefore a need in the art to optimize UE power consumption while providing the best possible user experience.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The terms "mobile device", "wireless device" and "user equipment" as used herein refers to a wireless communication device such as a cellular telephone, wireless terminal, user equipment, laptop computer, High Data Rate (HDR) subscriber station, access terminal, or other personal communication system (PCS) device. The device may be either mobile or stationary.

The term "measurement" is used herein to mean measurements and/or metric values.

Figure 1:
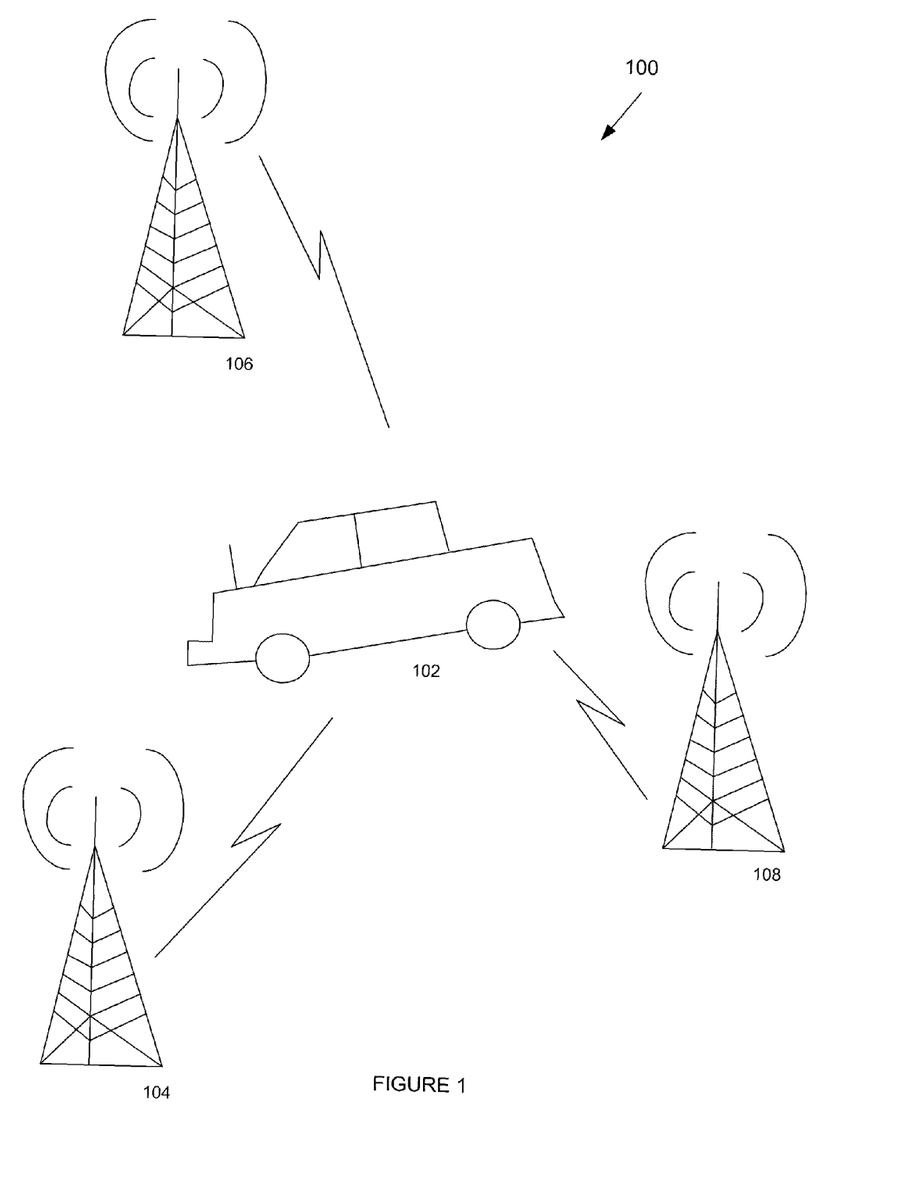
FIG. 1 is a diagram illustrating an example of a broadcast network in which protocol stack power optimization can be used.

FIG. 1 is a diagram illustrating an example of a wireless communications network in which protocol stack power optimization can be used. As seen in FIG. 1, wireless communications network 100 includes multiple base stations 104, 106 and 108 for transmitting wireless communications signals. Signals and data can be broadcast by base stations 104, 106 and 108 to supply user content and information. For example, streaming video, games or data for other applications may be delivered over the wireless network. A receiver UE 102 receives the data for use by the user. In this example, the receiver 102 is depicted as hosted by a car. However, receiving station 102 should not be limited as such, and can also represent, for example, a person, another mobile entity/device, or a stationary entity/device. Furthermore, the receiver can represent a computer, a laptop computer, a telephone, a mobile telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting protocol stack power optimization. A host system can be stationary or mobile, and it can be a digital device.

User experience on UE devices such as smart phones, smart books and laptops is affected by the capabilities of these devices in the areas of communication, computation, and user interface. As UE devices have a limited onboard battery, another key performance indicator of a UE device is the duration the device can be used without needing to be recharged (battery life). Often, improving the communication, computation and user interface capabilities of a UE device requires the expenditure of more energy, which in turn, reduces battery life. Thus, there is an inherent trade-off between battery life and other aspects of user experience. Examples of the trade-off between battery life and user experience related to the communication capability are shown in Table 1.

TABLE 1

| | User Experience Improvement Example | Improvement Technique | Cause of Energy Consumption Increase |
| --- | --- | --- | --- |
| Communication | Faster file download | Interference Cancellation to improve SNR and throughput | More digital operations executed to cancel interference. |
| Computation | Faster page display within a browser | Higher processor clock speed, Higher memory access rate | More digital switching activity due to faster clock, access |
| User Interface | Brighter picture | Increase screen brightness | More current consumed by display |

UE form factors for broadband 3G and 4G technologies are getting smaller while data rates on both downlink (DL) and uplink (UL) are increasing rapidly. This trend is stretching already limited battery resources at the UE and at the same time causing thermal heat dissipation issues such as UE overheating. Users have direct visibility into such issues through basic UE behavioral characterizations comprising standby-time, talk-time, device temperature etc. Because smaller form factor UE devices processing very large UL/DL data rates with limited battery life and/or limited heat dissipation capability will be the future norm, the UE must be as energy efficient as possible.

In order to optimize power and energy consumption at the UE, it is necessary to understand the UE power consumption trade-off with user experience. This involves identifying the optimal UE operating point so as to get the best performance with the minimum possible use of power resources in various scenarios of interest. For example, UEs today implement advanced receiver algorithms based on ideas such as equalization and interference cancellation that deliver higher data throughput compared to simpler more energy efficient receivers such as matched filters, but at an increased power cost. By identifying operating scenarios where the simpler energy efficient receiver architecture is best, power can be saved by turning off the advanced receiver algorithms in those scenarios. The presently disclosed method and algorithm for protocol stack power optimization operates the UE at the best trade-off point between user experience and power consumption.

UE power and energy consumption for communication is generally dominated by Radio Frequency (RF), Hardware (HW) and Software (SW) modules that are inherently tied to Physical (PHY) layer processing. This is partly due to the fact that peak PHY layer data rates are rapidly increasing and partly due to advanced computation intensive signal processing techniques being employed in PHY layer processing. Although performance metrics are defined at each layer of the protocol stack, it is the performance at the Application (APP) layer that is essential from an end-user perspective. In order to achieve the best trade-off between user experience and power consumption, information spread across various layers of the protocol stack is used by a protocol stack power optimization algorithm to optimally allocate energy resources. At a high level, the protocol stack power optimization algorithm has as input, measurements made at various layers of the protocol stack. The protocol stack power optimization algorithm has the ability to selectively control by power usage by outputting a set of actions, each of which has an impact on power usage of the UE. The protocol stack power optimization algorithm maps from a set of protocol layer metric measurements to a set of power conserving actions that provides the best trade-off between user experience and power consumption. Measurements made at the APP, transport, network, Radio Link Control (RLC), PHY layer and/or other user intent measurements are mapped to actions that switch unnecessary hardware off, limit peak power amplifier (PA) levels, reduce voltage to processors, reduce clock frequency to processors and/or switch advanced receivers on or off.

The protocol stack power optimization provides a practical trade-off between battery life and other aspects of user experience without querying the user for preferences. User experience is affected by a number of factors including the context in which the user is using the UE device, the actual content being consumed, the user's state of mind, and the extent of the user's need at the time to avail of the functionality provided by the mobile device. All these factors change dynamically. Protocol stack power optimization detects power use in the UE by providing a stimulus to the UE and monitoring the change in current/power consumption and/or data rate/Channel Quality Information (CQI). For example, the stimulus could be starting a File Transfer Protocol (FTP) download or beginning an internet browsing session on the UE.

Figure 2:
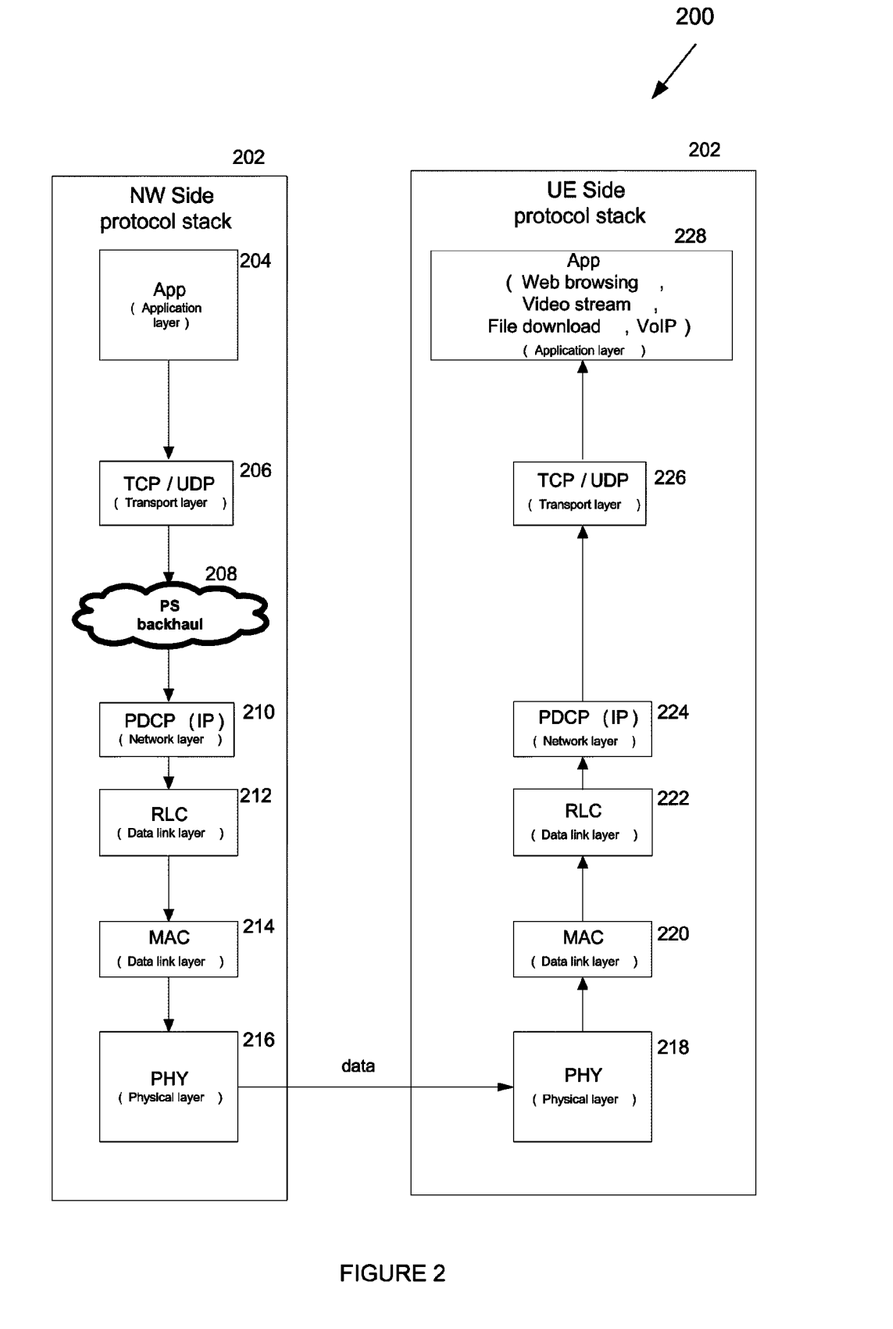
FIG. 2. is high level data flow diagram illustrating an exemplary flow of user data through user equipment and network side protocol stacks.

FIG. 2 shows an exemplary high level data flow through the protocol stack for a UE running an application 200. The application is typically requesting some form of data from the network (for example, accessing a website or downloading a file hosted on the internet). FIG. 2 shows an exemplary DL side of the data transfer from the network down the network protocol stack and up the UE the protocol stack. One skilled in the art would recognize that FIG. 2 is also applicable to the UL data flow direction. The data that the UE requests resides on a server somewhere in the network. The data is fetched, processed, packaged and routed down the network protocol stack by its APP layer 204, Transport layer 206, optional backhaul 208, Network layer 210, RLC layer 212 and MAC layer 214 to the PHY layer 216 of the network protocol stack. The physical layer of the network is responsible for transferring the packaged data to the physical layer of the UE 218 over a communication medium such as a wireless channel. Once the data is received at the UE physical layer 218, it travels up the stack by the UE MAC layer 220, RLC layer 222, Network layer 224, Transport layer where it is finally delivered to the UE application layer 228.

Each layer of the UE protocol stack 218-228 is required to meet certain Quality of Service (QoS) requirements in order to meet the desired performance requirements at the application layer 228. The QoS requirements at each layer are dictated by the underlying application that is requesting the data. The information available at the UE higher layers is beneficial in optimizing power/energy resources for achieving a certain level of performance at the application layer 228. Specific examples of actions that the protocol stack power optimization algorithm can take in order to optimize power consumption and specific examples of information from various layers used to manage power resources are detailed below.

Protocol Stack Power Optimization Algorithm Actions

The protocol stack power optimization algorithm controls RF, HW and SW modules that have a moderate to large power footprint in the UE power profile. For example, in most wireless communication UE devices, the Power Amplifier (PA) is a significant contributor to the overall power usage. Thus, being able to optimally control the PA power leads to significant power savings. The algorithm identifies key contributors to power consumption and creates a set of actions action comprising a hard switching on/off of modules or a soft reduction/enhancement of module functionality by trading off power with performance. The actions under the control of the protocol stack power optimization algorithm are dependent on the type of UE and its capabilities. Actions taken by protocol stack power optimization to conserve power in an exemplary UE device, comprise switching advanced signal processing algorithms on/off e.g., Equalizer, Interference Cancellation etc, limiting advanced signal processing algorithm capabilities e.g., reducing adaptive equalization rate with Equalizer, reducing number of cells to cancel with Interference Cancellation techniques, limiting peak PA power level (i.e. limiting UL data rate), Reducing voltage to processors and/or HW modules, reducing clock frequencies to processors and/or HW modules, switching Receive Diversity on/off, power collapsing unused HW modules, and clock gating of unused HW modules.

Protocol Stack Power Optimization Algorithm Measurements

Information measurements are obtained at different layers within a protocol stack.

Measurements at layers closer to the user, in other words higher layers (e.g. application, transport), often provides valuable information for better allocation of available energy to optimize the user experience. However, the propagation of this information to control communication capability and power consumption is more cumbersome. For instance, application layer context evaluation may require rewriting or modification of every individual application (Browser, Email, etc.) whereas transport layer context evaluation requires changes localized within an operating system (e.g. BREW, Android). In some cases, the higher layers of the protocol stack may even reside on different processors or modules than the PHY/MAC communication module (e.g. laptop using smart phone tethering for a WAN connection). Thus, depending on the device, there may be interest in using information from one or more layers. Value increases in combining information from multiple layers with user intent measurements. Information at each layer is classified as static (based on "state" or something changing infrequently) or dynamic (based on current conditions or something changing frequently).

User Intent Measurements

User intent measurements provide valuable information regarding the user experience expected by the user. By "measuring" user intent, the protocol stack power optimization algorithm can optimize power allocation so as to give the user the best possible user experience. Static profile-based assessment measurements used by the protocol stack power optimization algorithm may comprise time of day, cost, application communication sensitivity, and other values. For example, a user may want to get better download speeds at certain times of the day where as at other times download speed may be less important. Likewise, if a network advertises variable costs (e.g. decreasing costs for data delivery during idle periods of the network), a user could elect to increase download speeds to maximize usage during this period. Some applications may require better communication capabilities in order to deliver a good user experience compared to others. For example, watching a high definition streaming video clip would require a higher data rate compared with listening to a streaming audio clip. The protocol stack power optimization algorithm actions are fully user customizable.

Dynamic context-based assessment measurements used by the protocol stack power optimization algorithm may comprise sensor data for blood pressure/neural activity measurement, correlation between communication power expenditure and user experience and other values. A heightened level of user satisfaction/dissatisfaction with the user experience can be inferred from these measurements. Similarly, these measurements can also convey information regarding the sense of urgency with which the user is anticipating the experience.

At the application layer, one or several applications such as web browsing, file download, streaming video/audio, Voice over IP (VoIP) may be running concurrently. Depending on the particular application that is running, parameters and variables that determine performance or quality of user experience are measured. These dynamic variables are indicative of QoS metrics. Dynamic context-based assessment measurements may comprise an amount of data expected to be received, a desired data rate for receiving the remaining data and a deadline by which data must be received. If there is very little data expected to be received, power may be conserved. On the other hand, if a large amount of data remains to be received, a more aggressive approach to power management may be implemented. Information pertaining to expected data can be obtained by monitoring Application layer traffic. For example, if an Hyper Text Transfer Protocol (HTTP) get request is seen at the Application layer, a webpage download is expected shortly and power is expended to improve latency. Typically, higher data rates require and consume more the power resources. If the required data rate required is low, power is conserved whereas if the required data rate is high, additional power is expended. Most applications have latency requirements that they must meet in order to maintain a certain QoS. Power resources are managed efficiently according to the likelihood of meeting the latency requirement for a given application. Additionally, the application or set of applications running concurrently may be used to determine power profile preferences by the protocol stack power optimization algorithm.

Table 2 illustrates examples of applications and dynamic context based information pertaining to those applications utilized by the protocol stack power optimization algorithm. For example, with a file download application, the size of the remaining file to be downloaded and/or the total size of the file can be used to manage power resources for the remainder of the file download.

TABLE 2

| Application | APP Information |
|---|---|
| Browsing | Importance of remaining data (e.g., get low resolution image quickly and then slow down to get the rest) |
| File download | Size of remaining file, Size of file |
| Streaming video | Time lag between buffered time and playback time |
| VoIP | Vocoder state (e.g., differing data rate requests in speech bursts and silence periods) |

The Transport Layer provides transparent transfer of data between end users, providing reliable data transfer services to the upper layers. The Transport Layer controls the reliability of a given link through flow control, segmentation/desegmentation, and error control. An exemplary protocol running at this layer is the Transmission Control Protocol (TCP) protocol. An exemplary static profile based measurement is the port number on which the TCP session is setup (for example, the HTTP protocol at the application layer uses port number 80 at the TCP layer). Thus, the port number provides information regarding the nature of the application that is driving the TCP session. Examples of beneficial dynamic context based measurements at the transport layer comprise header information, retransmissions/out of order arrivals of packets, TCP connection context and other measurements. The TCP header field bit "FIN" carries information about whether the sender has more data to send. The payload data in TCP is indexed by "sequence numbers" in the TCP headers. If missing sequence numbers are detected, because TCP is error-free, we know that there will be remaining data to be received. During a TCP session, the protocol enters various states of operation. In some states such as "CLOSED", "TIME-WAIT", the UE is not really sending/receiving data. Monitoring the state of the TCP session is therefore also useful in determining how to allocate power resources.

Thus, user intent, application layer and transport layer measurements provide information from the higher levels of the protocol stack. Network, RLC, PHY/MAC layer and physical environment measurements, described below, are combined to provide information from the lower layers of the protocol stack to the protocol stack power optimization algorithm.

The Network Layer provides the functional and procedural means of transferring variable length data sequences from a source to a destination via one or more networks, while maintaining the QoS requested by the Transport Layer. An exemplary protocol running at this layer is the Internet Protocol (IP). An exemplary static profile based measurement is the source IP address. The DNS information pertaining to the source IP address is then used to determine the importance of data originating at the source for allocating power resources. Examples of dynamic context based information are the amount of data expected, the Quality of Service information and other measurements. For example, the IP header field "Total length" carries information regarding the total size of the IP packet. The size of the packet can provide information regarding how much data is yet to arrive from the link layer. The IP header carries information regarding the QoS that is expected for the data in the IP packet (in the field "Differentiated Service" or Type of Service (ToS)). The quality of service is captured in the dimensions of delay, throughput, reliability and cost.

The Data Link Layer provides the functional and procedural means to transfer data between network entities and to detect and possibly correct errors that may occur in the Physical Layer. The data link layer functionalities in Universal Mobile Telecommunications/High Speed Packet Access (UMTS/HSPA) are executed by two separate entities namely Radio Link Control (RLC) and Medium Access Control (MAC). Some examples of dynamic context based measurements at the Data Link layer may comprise the amount of future data expected, missing sequence number information in RLC/MAC layer packets/Negative Acknowledgement (NAK) rate, priorities and other measurements. The MAC layer is responsible for mapping logical channels (carrying signaling information and data) onto transport channels used at the PHY layer. As an example, with a UMTS HSDPA mode of operation, the MAC layer assembles MAC-d Protocol Data Unit (PDU)s into MAC-hs PDU's. The header of the MAC-hs PDU has fields "Size Index Identifier" and "Number", which provide information regarding the number and size of MAC-d PDU's in the current MAC-hs PDU. This information can again be used to allocate power resources by, for example, turning off advanced receiver functionality when no data is expected. When the RLC is operating in Acknowledged data transfer mode, the RLC sub-layer can keep track of the number of erroneously received RLC Service Data Units (SDU) by monitoring missing sequence numbers in the RLC Packet Data Units (PDU). Since data transfer in this mode is guaranteed to be error-free, this allows the UE to estimate the number of retransmissions that will come in the future. With UMTS HSDPA mode of operation, the MAC layer prioritizes the data according to higher layer requirements and provides information regarding the priority of the data in the MAC-d PDU using the "C/T" field. The C/T field can be used to determine the priority of the data in the "pipe" and allocate power resources accordingly. For example, if the C/T=1, the advanced receiver is enabled to for the best possible throughput.

Information available at the physical layer itself can also be used for optimal power allocation. Information obtained at the PHY layer may comprise physical layer data scheduling rate, a relationship between (Block Error Rate (BLER)/Transport Block Size (TBS)) and Channel Quality Information (CQI) seen by the UE, estimates of code/power resources being used by the physical layer, temperature of UE, UE Digital Signal Processor (DSP) loading, battery level, UE call state, UE measurement control messages, UE channel condition observations and other measurements. Data at the physical layer may arrive in bursts. The duty cycle of arriving data can be used to optimally allocate energy/power resources. For example, if there is a period where no data is being sent to the UE, the UE can turn off certain power intensive resources. UE CQI is communicated to the network by the UE in adaptive modulation and coding based feedback schemes. CQI is used by the network to determine optimal data rate allocation for the UE. The UE can determine if the network is being conservative or aggressive in scheduling data by monitoring the scheduled data rate (TBS) and BLER. The protocol stack power optimization algorithm uses this information to be conservative or aggressive with power allocation as well. E.g. if expending more energy to achieve a better CQI does not result in higher TBS, lower BLER, or higher throughput, the UE conserves power. In a UMTS network, a Base Station, or NodeB, has code space and power limitations. This information is used for power optimizations in the UE by tuning advanced receivers, which are sensitive to code/power allocations from the NodeB, using network loading measurement for optimal power efficiency. Monitoring the temperature of the UE provides information about the power consumption/heat dissipation. It is also a direct indicator of whether the UE can be safely operated. Temperature of the UE is used in deciding how to efficiently manage power to turn off power intensive enhancements in the UE at high temperatures. UE DSP processors are designed taking into account UE algorithmic processing requirements in terms of Million Instructions per Second (MIPS). Power consumed by the processor is proportional to the MIPS that are being used at a given instant of time. Processor loading is defined as the ratio of average MIPS usage to the maximum MIPS available. This information can be used to efficiently manage power utilization of the processor. For example, if the processor loading is low, the maximum MIPS of the processor is lowered by voltage/power scaling of the processor. The UE battery level is an indicator of remaining energy available to the UE. If the UE battery drops to a low level, many non-essential components of the UE device are turned off in order to increase standby/talk time etc. A network connected UE is in one of many "states" depending on the nature of the call/available resources/data rate requirements etc. is Most of the data processing is performed in certain states, while the UE is mostly idle in other states. The UE call state is used as an indicator of how much processing power is required from the UE, enabling the UE to conserve power during idle states and allocate additional power in busy states by turning on and off advanced receivers. Depending on UE channel conditions and available network resources, the UE could be asked by the network to make and report measurements to the network for purposes of transferring the UE to another frequency/Radio Access technology (RAT) etc. If the UE is asked to make Compressed Mode (CM) Inter-RAT measurements, advanced receivers are again turned off in anticipation moving from UMTS to another technology. Advanced receiver techniques such as Equalization and Interference cancellation provide performance benefits in high SNR, dispersive channel and high interference environments respectively. The protocol stack power optimization algorithm also Monitors channel/interference conditions to determine when advanced receivers are providing performance benefits and accordingly turn them on or off.

Thus, Network, RLC, PHY/MAC layer and physical environment measurements provide information from the lower levels of the protocol stack to the protocol stack power optimization algorithm.

Figure 3:
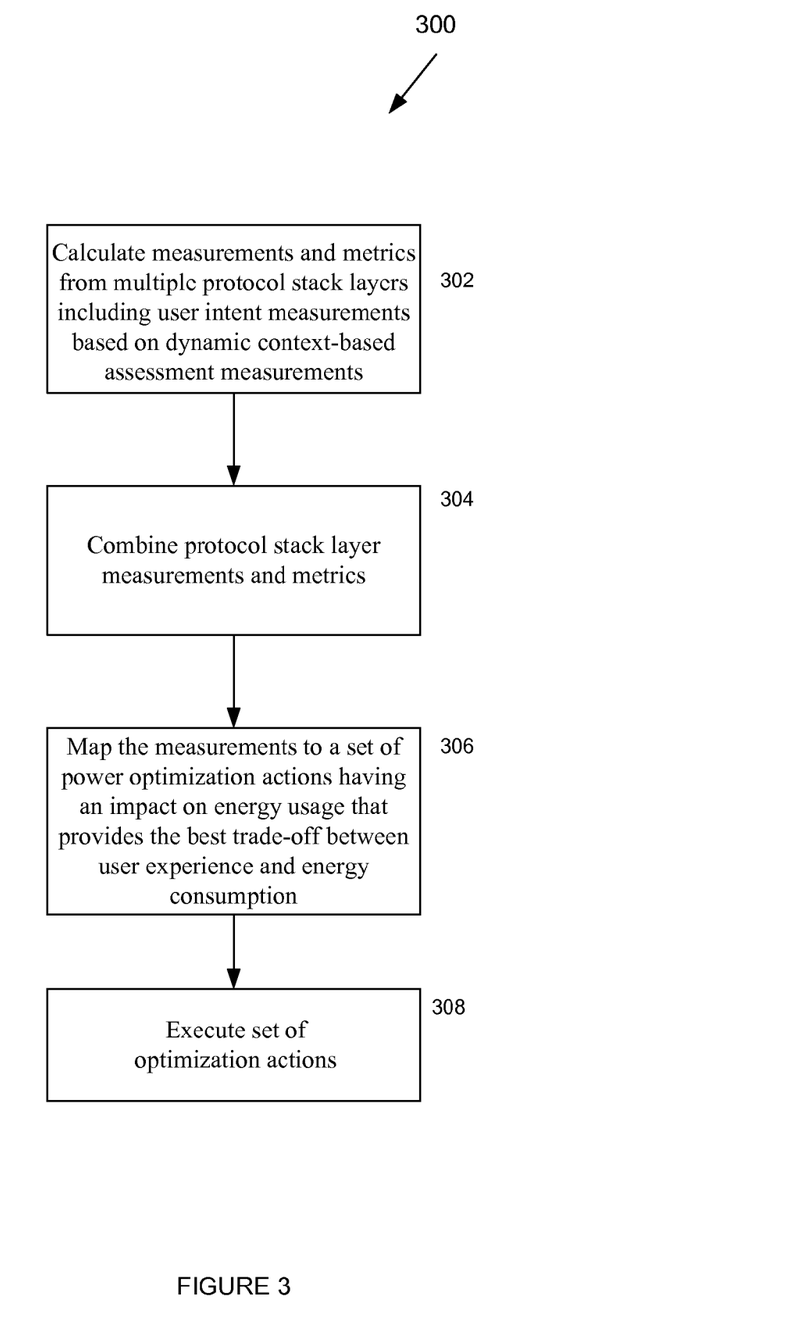
FIG. 3 is a flowchart illustrating an exemplary algorithm for protocol stack power optimization.

FIG. 3 is a flowchart illustrating an exemplary algorithm for protocol stack power optimization 300. Protocol stack power optimization begins in step 302 where measurements and metrics are calculated at multiple layers of a protocol stack including user intent measurements based on dynamic context-based assessment measurements. Control flow proceeds to step 304.

In step 304, the calculated measurements and metrics are combined. Control flow proceeds to step 306.

In step 306, a set of protocol stack power optimization actions is determined by mapping the measurements and metrics to a set of power optimization actions that provides the best trade-off between user experience and energy consumption according to a global system view. Control flow proceeds to step 308.

In step 308, the set of protocol stack power optimization actions are executed to optimally manage power resources of the wireless device.

Figure 4:
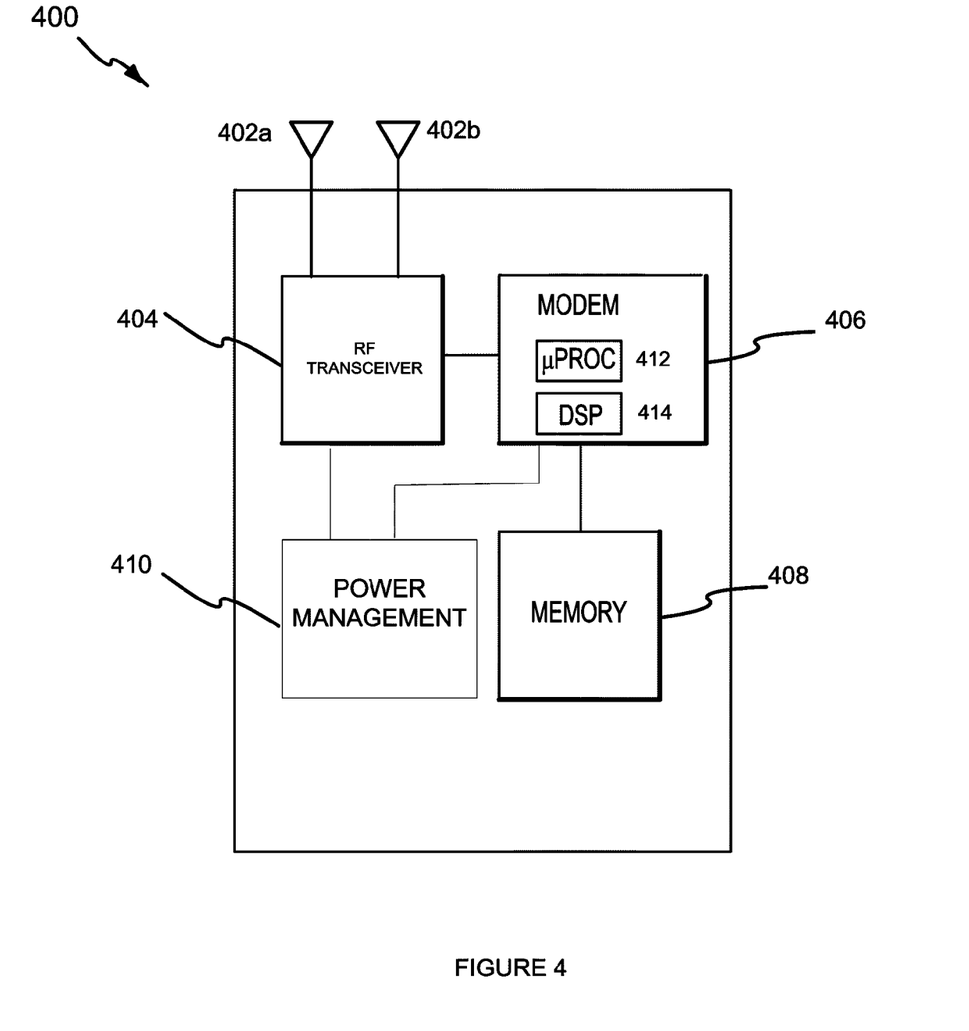
FIG. 4 is a block diagram illustrating an exemplary wireless device capable of protocol stack power optimization.

FIG. 4 is a block diagram illustrating an exemplary wireless device capable of protocol stack power optimization 400. Wireless device 400 comprises a wireless communication transceiver 404 and associated antennas 402a, 402b capable of sending and receiving wireless communication signals. Modem 406 comprises the appropriate microprocessor(s) 412, digital signal processor(s) 414 and other suitable hardware, such as a correlator bank, for processing signals. Power management 410 controls power for various components of wireless device 400. Memory 408 is coupled to modem 404 as necessary for implementing various modem processes and functionality for protocol stack power optimization. Wireless device 400 may comprise an appropriate user interface with alphanumeric keypad, display, microphone, speaker, and other necessary components (not shown). It will be appreciated by those skilled in the art that wireless device 400 may comprise a variety of components not shown.

The methodology for protocol stack power optimization described herein may be implemented by suitable instructions operating on the microprocessor 412 and memory 408 of wireless device 400, but is certainly not limited to such an implementation and may alternatively be implemented in hardware circuitry. The microprocessor 412 is connected to power management 410 and memory 408 having code or instructions directing the microprocessor 412 to perform protocol stack power optimization. Memory 408 may comprise instructions for performing protocol stack power optimization. The memory 408 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 412 executes instructions stored in memory 408 according to the steps of FIGS. 1-3 to perform protocol stack power optimization.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method for managing power in a wireless communication device comprising:

calculating measurements at multiple layers of a protocol stack operating on the wireless communication device and user intent measurements that include dynamic context-based assessment measurements;

combining the measurements;

mapping the combined measurements to a set of power optimization actions having an impact on energy usage of the wireless communication device that provides the best trade-off between user experience and energy consumption; and executing the set of power optimization actions to optimally manage power resources of the wireless communication device.

2. The method of claim 1 wherein the set of power optimization actions comprises any combination of switching advanced signal processing algorithms one of on and off, limiting advanced signal processing algorithm capabilities, reducing adaptive equalization rates, reducing a number of cells to cancel with interference cancellation techniques, limiting peak power amplifier (PA) power level, reducing voltage to at least one of processors and hardware (HW) modules, reducing clock frequencies to at least one of processors and HW modules, switching receive diversity one of on and off, power collapsing unused HW modules, and clock gating of unused HW modules.

3. The method of claim 1 wherein the multiple layers of the protocol stack comprise any combination of an application layer, a transport layer, a network layer, a Radio Link Control layer, a Data Link layer or a Physical layer.

4. The method of claim 3, further comprising:
calculating measurements at the application layer in the protocol stack wherein the application layer measurements comprise any combination of an amount of data expected to be received, a desired data rate for receiving remaining data or a deadline by which data must be received.

5. The method of claim 3, further comprising:
calculating measurements at the transport layer in the protocol stack wherein the transport layer measurements comprise any combination of a port number on which a TCP session is setup, header information, retransmissions or out of order arrivals of packets, or TCP connection context.

6. The method of claim 3, further comprising:
calculating measurements at the network layer in the protocol stack wherein the network layer measurements comprise any combination of a source IP address, amount of data expected, or Quality of Service information.

7. The method of claim 3, further comprising:
calculating measurements at the Data Link layer in the protocol stack wherein the Data Link layer measurements comprise any combination of an amount of future data expected, missing sequence number information, or priorities.

8. The method of claim 3, further comprising:
calculating measurements at the Physical layer in the protocol stack wherein the Physical layer measurements comprise any combination of a physical layer data scheduling rate, a relationship between at least one of Block Error Rate (BLER) and Transport Block Size (TBS) and Channel Quality Information (CQI) seen by the wireless communication device, estimates of at least one of code and power resources being used by the Physical layer, temperature of the wireless communication device, Digital Signal Processor (DSP) loading of the wireless communication device, battery level, call state of the wireless communication device, measurement control messages of the wireless communication device, and channel condition observations of the wireless communication device.

9. The method of claim 1, wherein the user intent measurements comprise any combination of time of day, cost, application communication sensitivity, sensor data for blood pressure or neural activity measurement, or correlation between communication power expenditure and user experience.

10. A wireless communications device comprising:
a wireless communications transceiver and at least one associated antenna capable of sending and receiving wireless communications signals;
a modem coupled to the wireless communications transceiver comprising at least one processor for processing signals and executing code stored in at least one memory;
a power management unit coupled to the modem and the wireless communications transceiver for measuring and controlling transmit power; and
the at least one memory coupled to the modem configured for storing instructions executable by the at least one processor for calculating measurements at multiple layers of a protocol stack operating on the wireless communications device and user intent measurements that include dynamic context-based assessment measurements, combining the measurements, mapping the combined measurements to a set of power optimization actions having an impact on energy usage of the wireless communications device that provides the best trade-off between user experience and energy consumption and executing the set of power optimization actions to optimally manage power resources of the wireless communications device.

11. The wireless communications device of claim 10, wherein the set of power optimization actions comprises any combination of switching advanced signal processing algorithms one of on and off, limiting advanced signal processing algorithm capabilities, reducing adaptive equalization rates, reducing a number of cells to cancel with interference cancellation techniques, limiting peak power amplifier (PA) power level, reducing voltage to at least one of processors and hardware (HW) modules, reducing clock frequencies to at least one of processors and HW modules, switching receive diversity one of on and off, power collapsing unused HW modules, and clock gating of unused HW modules.

12. The wireless communications device of claim 10, wherein the multiple layers of the protocol stack comprise any combination of an application layer, a transport layer, a network layer, a Radio Link Control layer, a Data Link layer or a Physical layer.

13. The wireless communications device of claim 12, wherein the at least one processor is configured to calculate measurements at the application layer in the protocol stack wherein the application layer measurements comprise any combination of an amount of data expected to be received, a desired data rate for receiving remaining data or a deadline by which data must be received.

14. The wireless communications device of claim 12, wherein the at least one processor is configured to calculate measurements at the transport layer in the protocol stack wherein the transport layer measurements comprise any combination of a port number on which the TCP session is setup, header information, retransmissions or out of order arrivals of packets, or TCP connection context.

15. The wireless communications device of claim 12, wherein the at least one processor is configured to calculate measurements at the network layer in the protocol stack wherein the network layer measurements comprise any combination of a source IP address, amount of data expected, or Quality of Service information.

16. The wireless communications device of claim 12, wherein the at least one processor is configured to calculate measurements at the Data Link layer in the protocol stack wherein the Data Link layer measurements comprise any combination of an amount of future data expected, missing sequence number information, or priorities.

17. The wireless communications device of claim 12, wherein the at least one processor is configured to calculate measurements at the Physical layer in the protocol stack wherein the Physical layer measurements comprise any combination of a physical layer data scheduling rate, a relationship between at least one of Block Error Rate (BLER) and Transport Block Size (TBS) and Channel Quality Information (CQI) seen by the wireless communication device, estimates of at least one of code and power resources being used by the Physical layer, temperature of the wireless communication device, Digital Signal Processor (DSP) loading of the wireless communication device, battery level, call state of the wireless communication device, measurement control messages of the wireless communication device, and channel condition observations of the wireless communication device.

18. The wireless communications device of claim 10, wherein the user intent measurements comprise any combination of time of day, cost, application communication sensitivity, sensor data for blood pressure or neural activity measurement, or correlation between communication power expenditure and user experience.

19. An apparatus for managing power in a wireless communication device comprising:
  means for calculating measurements at multiple layers of a protocol stack operating on the wireless communication device and user intent measurements that include dynamic context-based assessment measurements;
  means for combining the measurements;
  means for mapping the combined measurements to a set of power optimization actions having an impact on energy usage of the wireless communication device that provides the best trade-off between user experience and energy consumption; and
  means for executing the set of power optimization actions to optimally manage power resources of the wireless communication device.

20. The apparatus for managing power in the wireless communication device of claim 19 wherein the set of power optimization actions comprises any combination of switching advanced signal processing algorithms one of on and off, limiting advanced signal processing algorithm capabilities, reducing adaptive equalization rates, reducing a number of cells to cancel with interference cancellation techniques, limiting peak power amplifier (PA) power level, reducing voltage to at least one of processors and hardware (HW) modules, reducing clock frequencies to at least one of processors and HW modules, switching receive diversity one of on and off, power collapsing unused HW modules, and clock gating of unused HW modules.

21. The apparatus for managing power in the wireless communication device of claim 19 wherein the multiple layers of the protocol stack comprise any combination of an application layer, a transport layer, a network layer, a Radio Link Control layer, a Data Link layer or a Physical layer.

22. The apparatus for managing power in the wireless communication device of claim 21, further comprising:
  means for calculating measurements at the application layer in the protocol stack wherein the application layer measurements comprise any combination of an amount of data expected to be received, a desired data rate for receiving remaining data or a deadline by which data must be received.

23. The apparatus for managing power in the wireless communication device of claim 21, further comprising:
  means for calculating measurements at the transport layer in the protocol stack wherein the transport layer measurements comprise any combination of a port number on which a TCP session is setup, header information, retransmissions or out of order arrivals of packets, or TCP connection context.

24. The apparatus for managing power in the wireless communication device of claim 21, further comprising:
  means for calculating measurements at the network layer in the protocol stack wherein the network layer measurements comprise any combination of a source IP address, amount of data expected, or Quality of Service information.

25. The apparatus for managing power in the wireless communication device of claim 21, further comprising:
  means for calculating measurements at the Data Link layer in the protocol stack wherein the Data Link layer measurements comprise any combination of an amount of future data expected, missing sequence number information, or priorities.

26. The apparatus for managing power in the wireless communication device of claim 21, further comprising:
  means for calculating measurements at the Physical layer in the protocol stack wherein the Physical layer measurements comprise any combination of a physical layer data scheduling rate, a relationship between at least one of Block Error Rate (BLER) and Transport Block Size (TBS) and Channel Quality Information (CQI) seen by the wireless communication device, estimates of at least one of code and power resources being used by the Physical layer, temperature of the wireless communication device, Digital Signal Processor (DSP) loading of the wireless communication device, battery level, call state of the wireless communication device, measurement control messages of the wireless communication device, and channel condition observations of the wireless communication device.

27. The apparatus for managing power in the wireless communication device of claim 19 wherein the user intent measurements comprise any combination of time of day, cost, application communication sensitivity, sensor data for blood pressure or neural activity measurement, or correlation between communication power expenditure and user experience.

28. A computer readable medium having instructions stored thereon to cause a processor in a wireless communication device to:
  calculate measurements at multiple layers of a protocol stack operating on the wireless communication device and user intent measurements that include dynamic context-based assessment measurements;
  combine the measurements;
  map the combined measurements to a set of power optimization actions having an impact on energy usage of the wireless communication device that provides the best trade-off between user experience and energy consumption; and
  execute the set of power optimization actions to optimally manage power resources of the wireless communication device.

29. The computer readable medium of claim 28 wherein the set of power optimization actions comprises any combination of switching advanced signal processing algorithms one of on and off, limiting advanced signal processing algorithm capabilities, reducing adaptive equalization rates, reducing a number of cells to cancel with interference cancellation techniques, limiting peak power amplifier (PA) power level, reducing voltage to at least one of processors and hardware (HW) modules, reducing clock frequencies to at least one of processors and HW modules, switching receive diversity one of on and off, power collapsing unused HW modules, and clock gating of unused HW modules.

30. The computer readable medium of claim 28 wherein the multiple layers of the protocol stack comprise any combination of an application layer, a transport layer, a network layer, a Radio Link Control layer, a Data Link layer or a Physical layer.

31. The computer readable medium of claim 30, further comprising instructions to cause a processor to calculate measurements at the application layer in the protocol stack wherein the application layer measurements comprise any combination of an amount of data expected to be received, a desired data rate for receiving remaining data or a deadline by which data must be received.

32. The computer readable medium of claim 30, further comprising instructions to cause a processor to calculate measurements at the transport layer in the protocol stack wherein the transport layer measurements comprise any combination of a port number on which a TCP session is setup, header information, retransmissions or out of order arrivals of packets, or TCP connection context.

33. The computer readable medium of claim 30, further comprising instructions to cause a processor to calculate measurements at the network layer in the protocol stack wherein the network layer measurements comprise any combination of a source IP address, amount of data expected, or Quality of Service information.

34. The computer readable medium of claim 30, further comprising instructions to cause a processor to calculate measurements at the Data Link layer in the protocol stack wherein the Data Link layer measurements comprise any combination of an amount of future data expected, missing sequence number information, or priorities.

35. The computer readable medium of claim 30, further comprising instructions to cause a processor to calculate measurements at the Physical layer in the protocol stack wherein the Physical layer measurements comprise any combination of a physical layer data scheduling rate, a relationship between at least one of Block Error Rate (BLER) and Transport Block Size (TBS) and Channel Quality Information (CQI) seen by the wireless communication device, estimates of at least one of code and power resources being used by the Physical layer, temperature of the wireless communication device, Digital Signal Processor (DSP) loading of the wireless communication device, battery level, call state of the wireless communication device, measurement control messages of the wireless communication device, and channel condition observations of the wireless communication device.

36. The computer readable medium of claim 28 wherein the user intent measurements comprise any combination of time of day, cost, application communication sensitivity, sensor data for blood pressure or neural activity measurement, or correlation between communication power expenditure and user experience.

37. An algorithm for managing power in a wireless communication device comprising:
inputting measurements made in layers of a protocol stack and user intent measurements that include dynamic context-based assessment measurements; and
selectively controlling a set of actions, each action having an impact on energy usage of the wireless communication device.

38. The algorithm of claim 37 wherein the set of actions comprises any combination of switching advanced signal processing algorithms one of on and off, limiting advanced signal processing algorithm capabilities, reducing adaptive equalization rates, reducing a number of cells to cancel with interference cancellation techniques, limiting peak power amplifier (PA) power level, reducing voltage to at least one of processors and hardware (HW) modules, reducing clock frequencies to at least one of processors and HW modules, switching receive diversity one of on and off, power collapsing unused HW modules, and clock gating of unused HW modules.

39. The algorithm of claim 37 wherein the layers of the protocol stack comprise any combination of an application layer, a transport layer, a network layer, a Radio Link Control layer, a Data Link layer or a Physical layer.

* * * * *